(12) United States Patent
Abe et al.

(10) Patent No.: US 11,869,686 B2
(45) Date of Patent: Jan. 9, 2024

(54) FLUIDIZING PARTICLE AND MAGNETIC CORE

(71) Applicant: TDK CORPORATION, Tokyo (JP)

(72) Inventors: Kyotaro Abe, Tokyo (JP); Hideharu Moro, Tokyo (JP); Toshiaki Kikuchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 131 days.

(21) Appl. No.: 17/211,304

(22) Filed: Mar. 24, 2021

(65) Prior Publication Data

US 2021/0299747 A1    Sep. 30, 2021

(30) Foreign Application Priority Data

Mar. 24, 2020    (JP) ................................ 2020-052767

(51) Int. Cl.
| | |
|---|---|
| *B22F 1/054* | (2022.01) |
| *B22F 1/16* | (2022.01) |
| *H01F 1/147* | (2006.01) |
| *H01F 1/33* | (2006.01) |
| *B82Y 40/00* | (2011.01) |
| *B82Y 25/00* | (2011.01) |

(52) U.S. Cl.
CPC ............... *H01F 1/33* (2013.01); *B22F 1/054* (2022.01); *B22F 1/16* (2022.01); *H01F 1/147* (2013.01); *B22F 2301/05* (2013.01); *B22F 2301/35* (2013.01); *B82Y 25/00* (2013.01); *B82Y 40/00* (2013.01)

(58) Field of Classification Search
CPC .... B22F 1/16; B22F 2301/15; B22F 2301/35; H01F 1/147; H01F 1/054; H01F 1/33; H01F 1/24; H01F 1/1475; H01F 3/08; B82Y 40/00; B82Y 25/00

See application file for complete search history.

(56) References Cited

U.S. PATENT DOCUMENTS

| | | | |
|---|---|---|---|
| 2010/0044618 A1* | 2/2010 | Ishimine | H01F 3/02 427/127 |
| 2011/0227679 A1* | 9/2011 | Koeda | B22F 1/0003 335/297 |
| 2013/0228717 A1 | 9/2013 | Harada et al. | |
| 2015/0108392 A1* | 4/2015 | Gotoh | H01F 1/33 148/285 |
| 2017/0018343 A1 | 1/2017 | Nishimura et al. | |
| 2018/0108465 A1* | 4/2018 | Takahashi | C22C 33/0278 |

FOREIGN PATENT DOCUMENTS

| | | |
|---|---|---|
| JP | H06-172768 A | 6/1994 |
| JP | 2001-135515 A | 5/2001 |
| JP | 2013-051329 A | 3/2013 |
| JP | 2017-145494 A | 8/2017 |
| JP | 2019-182951 A | 10/2019 |
| WO | 2018-163823 A1 | 9/2018 |

\* cited by examiner

*Primary Examiner* — Humera N. Sheikh
*Assistant Examiner* — Kevin Ct Li
(74) *Attorney, Agent, or Firm* — Oliff PLC

(57) ABSTRACT

The object of the present invention is to provide a fluidizing particle capable of improving a fluidity of a magnetic particle for a magnetic core and capable of improving a permeability of the magnetic core. The fluidizing particle includes a particle body having a magnetic property and a coating layer including a silicon compound covering the particle body, wherein a particle size of the fluidizing particle is 10 to 40 nm, and a circularity of the fluidizing particle is 0.55 or more.

17 Claims, 1 Drawing Sheet

FLUIDIZING PARTICLE AND MAGNETIC CORE

TECHNICAL FIELD

The present invention relates to a fluidizing particle and a magnetic core.

BACKGROUND

In recent years, electronic devices have become compact and along with that, the electronic devices which can be used under high frequency are in demand. For the electronic devices such as a magnetic core using a magnetic particle, the electronic devices are adapted to be used under high frequency by making a particle size of the magnetic particle small. However, when the particle size of the magnetic particle is decreased, a fluidity of the magnetic particle is deteriorated.

The magnetic core is formed by mixing and pressing a material which includes the magnetic particle, a resin, and the like (hereinafter, such material may be referred as a magnetic material), however when the magnetic particle has a poor fluidity, packing of the magnetic particle may be compromised and a core density may decrease, further a permeability may decrease.

From the point of improving the fluidity of the magnetic particle, $SiO_2$ AEROSIL is conventionally used as a fluidizing material. A small amount of such fluidizing agent is added to the magnetic material. However, $SiO_2$ AEROSIL has a small bulk density such as 0.05 to 0.15 g/cm$^3$. Thus, $SiO_2$ AEROSIL exhibits a poor dispersibility in the magnetic material, and the fluidity of the magnetic particle is not sufficiently improved.

Patent Document 1 discloses a plastic working lubricant having a magnetic property and a lubrication effect by adhering or impregnating phosphoric acid and stearic acid to a porous magnetic material. However, because the size of the porous magnetic material is too large and also because of a small bulk density as it is porous, the plastic working lubricant is not an appropriate fluidizing material of the magnetic particle for the magnetic core.

Therefore, a fluidizing material having a large bulk density and capable of improving a fluidity of the magnetic particle is demanded. Further, the fluidizing material having a magnetic property can not only improve the fluidity but also a permeability of the magnetic core.

[Patent Document 1] JP Patent Application Laid Open No. H06-172768

SUMMARY

The present invention is achieved in view of such circumstances, and the object is to provide a fluidizing particle improving a fluidity of the magnetic particle for a magnetic core and improving a permeability of the magnetic core, and also to provide the magnetic core using the fluidizing particle.

The gist of the present invention is as follows.

(1) A fluidizing particle including
a particle body having a magnetic property and a coating layer including a silicon compound covering the particle body, wherein
a particle size of the fluidizing particle is 10 to 40 nm, and a circularity of the fluidizing particle is 0.55 or more.

(2) The fluidizing particle according to (1), wherein the particle body includes at least one selected from the group consisting of Fe, Co, and Ni.

(3) The fluidizing particle according to (1) or (2), wherein a bulk density is 0.6 to 1.4 g/cm$^3$.

(4) A magnetic core including the fluidizing particle according to any one of (1) to (3) and a magnetic particle having a particle size larger than a particle size of the fluidizing particle.

DETAILED DESCRIPTION

Figure 1:
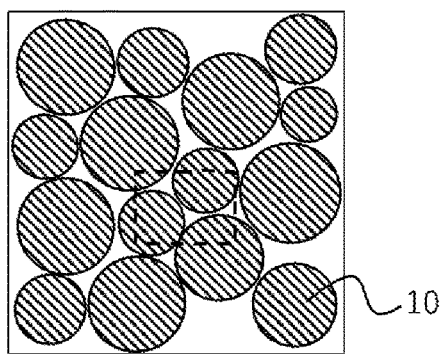
FIG. 1 is a schematic diagram showing a function of a fluidizing particle according to one embodiment of the present invention.

Hereinafter, the present invention is described based on specific embodiments, however various modifications may be included within the scope of the present invention.

(Fluidizing Particle)

A fluidizing particle according to the present embodiment is used by adding a small amount to a magnetic material. By adding the fluidizing particle to the magnetic material including a magnetic particle for a magnetic core, the fluidity of the magnetic particle for the magnetic core can be improved. Also, the fluidizing particle according to the present embodiment has a magnetic property, thus the magnetic core including the fluidizing particle according to the present embodiment has an improved permeability.

The fluidizing particle according to the present embodiment has a particle body having a magnetic property and a coating layer including a silicon compound covering the particle body.

The particle body includes a material having a magnetic property. As the material having a magnetic property, a soft magnetic metal, a soft magnetic alloy, or a known magnetic amorphous material can be used.

Specifically, the particle body preferably may include at least one selected from the group consisting of Fe, Co, and Ni; and more preferably Fe or Co may be included. More preferably, the particle body may be Fe, or an alloy of Fe and Co.

As the particle body includes the above-mentioned material or the above-mentioned element, the bulk density of the fluidizing particle can be increased. Also, the fluidizing particle can have a magnetic property, and when the fluidizing particle is added to the magnetic material for the magnetic core, a permeability of the magnetic core can be enhanced.

The coating layer is formed so that the surface of the particle body is covered. The coating layer is preferably formed to part of or entire surface of the particle body within the range that the desired fluidity can be ensured. The particle body may be covered by the coating layer in a continuous manner, or in a discontinuous manner. That is, as long as the desired fluidity can be obtained, a pin hole may be formed to the coating layer, or the particle body may be partially exposed. Note that, a thickness of the coating layer may be preferably 1 to 4 nm.

The coating layer includes a silicon compound. The silicon compound is not particularly limited, and for example $SiO_2$, $SiO$, $Si_3N_4$, $MgSiO_3$, and the like may be mentioned. Preferably, the silicon compound may be $SiO_2$. The coating layer may include substances as additives other than the silicon compound as long as the desired fluidity is ensured. However, an extremely hard additives such as $Al_2O_3$ and the like which may stick into the magnetic particle for the magnetic core is preferably not used since such additives may compromise the fluidity.

By coating the particle body with the coating layer including the silicon compound, the fluidity of the magnetic particle for the magnetic core can be improved.

The particle size of the fluidizing particle according to the present embodiment is 10 to 40 nm, and preferably 15 to 40 nm. The particle size includes the thickness of the coating layer. By having the particle size of the fluidizing particle within the above-mentioned range, the fluidizing particle is easily dispersed when it is mixed to the magnetic material for the magnetic core. As a result, the fluidity of the magnetic particle for the magnetic core is improved, and also the permeability of the magnetic core is improved.

The circularity of the fluidizing particle according to the present embodiment is 0.55 or more, preferably 0.60 or more, and more preferably 0.69 or more. As the magnetic material for the magnetic core includes the fluidizing particle having the circularity within the above-mentioned range, rotation of the magnetic particle for the magnetic core is facilitated when the magnetic material is mixed, and as a result, the fluidity of the magnetic particle is improved. Further, the core density of the magnetic core is increased and the permeability is improved.

The particle size and the circularity are determined as described in below. A cross section shape of the fluidizing particle is observed, and at least 20 or more, and preferably 100 or more of randomly selected cross sections of the particles are observed to determine the particle size and circularity of each particle. As one example of the particle size, a Heywood diameter (a diameter of a circle having a same area as a projected area of the particle) can be used. As one example of the circularity, a Wadell circularity (a ratio of a diameter of a circle which is equal to the projected area of the particle cross section with respect to a diameter of the circle circumscribing to the particle cross section) can be used. TEM, SEM, and the like are used for observation, and an image analysis can be used for calculating the particle size and the circularity.

The bulk density of the fluidizing particle according to the present embodiment is preferably 0.6 to 1.4 $g/cm^3$, preferably 0.6 to 1.3 $g/cm^3$, and more preferably 0.7 to 1.3 $g/cm^3$. By having the bulk density within the above-mentioned range, the fluidizing particle is thoroughly dispersed in the magnetic material, and the fluidity of the magnetic particle for the magnetic core can be improved. The bulk density is measured based on JIS-Z-5101.

A method for producing the fluidizing particle according to the present embodiment is not particularly limited as long as the fluidizing particle has the above-mentioned particle size and circularity. For example, the fluidizing particle according to the present embodiment is obtained by a step of forming the particle body and a step of forming the coating layer to the particle body. The step of forming the particle body and the step of forming the coating layer to the particle body may be performed independently or may be performed consecutively.

The method of forming the particle body is not particularly limited, and various powderization methods such as a wet method, a pulverization method, a vapor phase method, a spray pyrolysis method, a melting method, and the like may be used. The method for producing the fluidizing particle according to the present embodiment preferably includes a wet method. During the production using a wet method, a solution including metal ions which becomes an alloy of the particle can be used; and a compound of constituting metals for example chlorides, oxides, hydroxides, nitrides, and carbides; various salts such as nitrates, sulfates, and carbonates; and hydrates, organic solvates thereof, and the like can be used as a raw material. By using the solution obtained by regulating an amount ratio of each metal compound and then mixing, a particle body alloy having a desired composition ratio can be formed. In the present embodiment, when the particle body alloy made of Fe and Co is formed, for example iron chloride hydrate and cobalt chloride hydrate are used. Based on the amount ratio of Fe and Co included in iron chloride hydrate and cobalt chloride hydrate, iron chloride hydrate and cobalt chloride hydrate are weighed to make a mixture solution, thereby Fe/Co ratio in the alloy composition can be regulated. A mass ratio of Fe/Co is preferably 9/1 to 3/7. Also, by regulating concentration, temperature, pH, and the like of the above-mentioned mixture solution, a precipitation process of the particle can be controlled hence particles with different sizes and circularities can be obtained.

A method for forming the coating layer is not particularly limited. The coating layer is preferably formed by performing a wet treatment to the particle body, however the coating layer may be formed by performing a dry treatment. The raw material of the silicon compound used for the coating layer is not particularly limited, and oxides and hydroxides of silicon, compounds such as salts and alkoxide of silicon, and hydrates thereof, and the like may be used.

When the step of forming the particle body and the step of forming the coating layer are performed continuously, a wet method is preferably employed. In the wet method, the formed particle body is in a liquid, hence the particle body does not aggregate since liquid exist between the particles, and the coating layer can be formed while the particle bodies are dispersed. Also, the raw material of the silicon compound used for the coating layer is mixed or dissolved into the liquid in which the particles are dispersed, thereby the situation where the particles in an aggregated state coated by the coating layer can be avoided. Thus, the particle size and the circularity of the particle body itself reflect the particle size, and the circularity of the fluidizing particle, therefore the particle size and the circularity can be controlled. Also, by regulating the concentration, the solution temperature, pH, and the like of the silicon compound, the thickness of the coating layer can be varied. As for a solvent, for example, water, an organic solvent, or a mixture solvent of these may be mentioned. When the step of forming the particle body and the step of forming the coating layer are performed continuously, a solubility of the particle raw material, the dispersibility of the particle body, and a solubility of the silicon compound need to be taken into account. In the present embodiment, as the organic solvent, alcohol compound is preferable, for example, monohydric alcohols such as methanol, ethanol, and the like; polyols such as ethyleneglycol, propyleneglycol, and the like; and as the silicon compound, for example, tetraethoxysilane (TEOS) can be used.

(Magnetic Core)

The magnetic core according to the present embodiment includes the above-mentioned fluidizing particle and the magnetic particle for the magnetic core having a larger particle size than the above-mentioned fluidizing particle.

The particle size of the magnetic particle for the magnetic core may preferably be 3 to 50 μm, and more preferably 5 to 30 μm.

The magnetic particle for the magnetic core is not particularly limited as long as it has a magnetic property; and preferably it includes Fe. The magnetic particle may include at least one selected from the group consisting of Ni, Si, and Cr. Therefore, as the magnetic particle, for example, pure iron (Fe), Fe—Si—Cr based alloy, Fe—Ni based alloy, Fe—Ni—Si—Co based alloy, and the like can be used.

Also, the magnetic particle for the magnetic core preferably has an insulation coating. A method for forming the insulation coating is not particularly limited, and it may be formed by a resin or an inorganic material; or the insulation coating may be an oxide film made by oxidizing the surface of the magnetic particle by heat treatment. Specifically, for example, the magnetic particle having an insulation coating made of $SiO_2$, or an insulation coating formed by performing a phosphoric acid treatment can be used.

In the magnetic core according to the present embodiment, an amount of the fluidizing particle is preferably 0.2 to 1.0 wt % with respect to 100 wt % of the magnetic particle. By having the amount of the fluidizing particle within the above-mentioned range, the fluidity of the magnetic particle for the magnetic core is improved and the magnetic core having a high core density can be obtained.

The magnetic core according to the present embodiment may include a resin as a binder. When the magnetic core as a whole is 100 wt %, an amount of the binder can be 2 wt % to 10 wt %. By binding the magnetic particle and the fluidizing particle with the resin, the magnetic core can be fixed to a desired shaped. Also, the magnetic core may include substances other than the magnetic particle, the fluidizing particle, and the binder as long as the magnetic property of the magnetic core is not compromised.

A method for producing the magnetic core according to the present embodiment is not particularly limited and known methods can be used as long as the above-mentioned magnetic particle and the fluidizing particle are used. For example, the magnetic particle and the fluidizing particle are mixed with a known resin as the binder, and a mixed product is obtained. If needed, the obtained mixed product may be formed into a granule. Then, the mixed product or the granule is filled into the mold and compression molding is performed to obtain a molded article having a desired shape of the magnetic core. The obtained molded article is heat treated for example at 50 to 200° C. to cure the resin, thereby the magnetic core in which the magnetic particle and the fluidizing particle are fixed by the resin is obtained.

The magnetic core according to the present embodiment is suitably used as a magnetic core of a coil type electronic component such as inductor device and the like. For example, the coil type electronic component may have an air core coil which is formed by winding wire and embedded in the magnetic core having a desired shape; or the coil type electronic component maybe formed by winding a wire for a predetermined number of turns to the surface of the magnetic core having a desired shape. As a shape of the magnetic core having a wire wound around, FT-type, ET-type, EI-type, UU-type, EE-type, EER-type, UI-type, a drum type, a toroidal type, a pot type, a cup type, and the like may be mentioned.

Hereinabove, the embodiments of the present invention have been described, however the present invention is not limited thereto, and various modifications may be done within the scope of the present invention.

EXAMPLES

Hereinbelow, the present invention is described in further detail using examples, however the present invention is not limited thereto.

A particle size, a circularity, and a bulk density of a fluidizing particle were measured as described in below. Results are shown in Table 1.

<Particle Size and Circularity>

The particle size and the circularity of the fluidizing particle were measured using an analysis result of TEM image. As the particle size, Haywood diameter was calculated, and as the circularity, Wadell circularity was calculated.

<Bulk Density>

The bulk density of the fluidizing particle was measured based on JIS-Z-5101 and by using a bulk specific gravity measuring device (for pigment) made by TsuTsui Scientific Instruments Co., LTD.

A fluidity of a mixed product of the magnetic particle for the magnetic core and the fluidizing particle, a core density of the magnetic core, a permeability of the magnetic core were measured as described in below. Results are shown in Table 1.

<Fluidity>

The fluidity of the mixed product of the magnetic particle for the magnetic core and the fluidizing particle was measured based on JIS-Z-2502 and by using a fluidity measuring device (for metal powder) made by TsuTsui Scientific Instruments Co., LTD.

<Core Density>

A core density was calculated from a weight of the magnetic core measured by using a balance scale and a volume measured by a micrometer.

<Permeability>

LCR meter (4284A made by Agilent) and DC bias current source (42841A made by Agilent) were used, and an inductance of the magnetic core at a frequency of 1 MHz was measured, and the permeability of the magnetic core was calculated from the inductance.

Example 1

The fluidizing particle formed by a particle body made of Fe—Co based alloy and a coating layer including $SiO_2$ was obtained by using a wet method as described in the above-mentioned embodiments. A mass ratio of Fe/Co in the obtained particle body was 4/1. A thickness of the coating layer was 2 nm, and a particle size of the obtained fluidizing particle was 15 nm.

The magnetic particle for the magnetic core made of Fe—Si—Cr based alloy including the insulation coating made of $SiO_2$ was prepared. The magnetic particle had a particle size of 25 μm. The magnetic particle and the above-mentioned fluidizing particle were mixed, and the fluidity was measured. An amount of the fluidizing particle was 0.5 wt % with respect to 100 wt % of the magnetic particle.

Next, the magnetic core was produced. An epoxy resin as a heat curing resin and a curing agent were weighed so that a total amount of these was 3 wt % with respect to 100 wt % of the magnetic particle and the fluidizing particle in total. Then, acetone was added to form a solution, and this solution was mixed with the magnetic particle and the fluidizing particle. After mixing was done, acetone was evaporated to obtain granules and sieved using 355 μm mesh. Then, the granules were filled in a toroidal form mold having an outer diameter of 11 mm, and an inner diameter of 6.5 mm, and molding pressure of 6.0 t/cm² was applied, thereby a molded article of the magnetic core was obtained. The obtained molded article of the magnetic core was heated for 1 hour at 180° C. for curing the resin, thereby the magnetic core was obtained. Regarding the obtained magnetic core, the core density and the permeability were measured.

Example 2

The fluidizing particle was obtained as same as Example 1 except that the particle size of the fluidizing particle was 25 nm. Also, the magnetic core was obtained as same as Example 1.

Example 3

The fluidizing particle was obtained as same as Example 1 except that the particle size of the fluidizing particle was 40 nm. Also, the magnetic core was obtained as same as Example 1.

Example 4

The fluidizing particle was obtained as same as Example 1 except for using the particle body made of Fe. Also, the magnetic core was obtained as same as Example 1.

Example 5

The fluidizing particle was obtained as same as Example 4 except that the particle size of the fluidizing particle was 25 nm. Also, the magnetic core was obtained as same as Example 1.

Example 6

The fluidizing particle was obtained as same as Example 4 except that the particle size of the fluidizing particle was 40 nm. Also, the magnetic core was obtained as same as Example 1.

Example 7

The fluidizing particle was obtained as same as Example 1. Also, the magnetic core was obtained as same as Example 1 except that the magnetic particle of Fe—Ni based alloy was used for the magnetic core.

Example 8

The fluidizing particle was obtained as same as Example 2. Also, the magnetic core was obtained as same as Example 1 except that the magnetic particle of Fe—Ni based alloy was used for the magnetic core.

Example 9

The fluidizing particle was obtained as same as Example 3. Also, the magnetic core was obtained as same as Example 1 except that the magnetic particle of Fe—Ni based alloy was used for the magnetic core.

Example 10

The fluidizing particle was obtained as same as Example 4. Also, the magnetic core was obtained as same as Example 1 except that the magnetic particle of Fe—Ni based alloy was used for the magnetic core.

Example 11

The fluidizing particle was obtained as same as Example 5. Also, the magnetic core was obtained as same as Example 1 except that the magnetic particle of Fe—Ni based alloy was used for the magnetic core.

Example 12

The fluidizing particle was obtained as same as Example 6. Also, the magnetic core was obtained as same as Example 1 except that the magnetic particle of Fe—Ni based alloy was used for the magnetic core.

Comparative Example 1

A particle having a particle size of 5 nm made of a particle body of Fe—Co based alloy and a coating layer made of $SiO_2$ was obtained by a wet method. A magnetic core was obtained as same as Example 1 except for using this particle instead of the fluidizing particle.

Comparative Example 2

A particle having a particle size of 60 nm made of a particle body of Fe—Co based alloy and a coating layer made of $SiO_2$ was obtained by a wet method. A magnetic core was obtained as same as Example 1 except for using this particle instead of the fluidizing particle.

Comparative Example 3

A particle having a particle size of 5 nm made of a particle body of Fe and a coating layer made of $SiO_2$ was obtained by a wet method. A magnetic core was obtained as same as Example 4 except for using this particle instead of the fluidizing particle.

Comparative Example 4

A particle having a particle size of 60 nm made of a particle body of Fe and a coating layer $SiO_2$ was obtained by a wet method. A magnetic core was obtained as same as Example 4 except for using this particle instead of the fluidizing particle.

Comparative Examples 5 to 7

A particle constituted of a particle body of Fe and a coating layer made of $SiO_2$ was obtained by a wet method. A particle size was 40 nm and a circularity was adjusted. A magnetic core was obtained as same as Example 1 except for using this particle instead of the fluidizing particle.

Examples 13 and 14

A fluidizing particle was obtained as same as Example 3 except for adjusting the circularity. The magnetic core was obtained as same as Example 1.

Comparative Example 8

A magnetic core was obtained as same as Example 1 except for using SiO$_2$ AEROSIL having a particle size of 40 nm instead of the fluidizing particle.

Example 15

A fluidity particle was obtained as same as Example 3. A magnetic core was obtained as same as Example 1 except that an amount of the fluidity particle was 0.2 wt % with respect to 100 wt % of a magnetic particle for the magnetic core.

Example 16

A fluidity particle was obtained as same as Example 3. A magnetic core was obtained as same as Example 1 except that an amount of the fluidity particle was 0.7 wt % with respect to 100 wt % of a magnetic particle for the magnetic core.

Example 17

A fluidity particle was obtained as same as Example 3. A magnetic core was obtained as same as Example 1 except that an amount of the fluidity particle was 1.0 wt % with respect to 100 wt % of a magnetic particle for the magnetic core.

TABLE 1

| | Fluidizing particle | | | | Magnetic particle for magnetic core | | Mixed product of fluidizing particle and magnetic particle for magnetic core | | Magnetic core | |
|---|---|---|---|---|---|---|---|---|---|---|
| | Particle size (nm) | Metal composition | Circularity | Bulk density (g/cm$^3$) | Particle size (μm) | Metal composition | Amount of fluidizing particle (wt %) | Fluidity (sec/50 g) | Core density (g/cm$^3$) | Permeability (@1 MHz) |
| Example 1 | 15 | FeCo | 0.82 | 0.8 | 25 | FeSiCr | 0.5 | 32 | 5.9 | 63 |
| Example 2 | 25 | FeCo | 0.79 | 1.0 | 25 | FeSiCr | 0.5 | 30 | 5.9 | 63 |
| Example 3 | 40 | FeCo | 0.77 | 1.4 | 25 | FeSiCr | 0.5 | 29 | 6.0 | 65 |
| Example 4 | 15 | Fe | 0.81 | 0.7 | 25 | FeSiCr | 0.5 | 33 | 5.8 | 61 |
| Example 5 | 25 | Fe | 0.80 | 1.0 | 25 | FeSiCr | 0.5 | 31 | 5.8 | 61 |
| Example 6 | 40 | Fe | 0.78 | 1.3 | 25 | FeSiCr | 0.5 | 31 | 5.9 | 63 |
| Example 7 | 15 | FeCo | 0.82 | 0.8 | 25 | FeNi | 0.5 | 31 | 6.4 | 67 |
| Example 8 | 25 | FeCo | 0.79 | 1.0 | 25 | FeNi | 0.5 | 29 | 6.5 | 70 |
| Example 9 | 40 | FeCo | 0.77 | 1.4 | 25 | FeNi | 0.5 | 28 | 6.5 | 70 |
| Example 10 | 15 | Fe | 0.81 | 0.7 | 25 | FeNi | 0.5 | 34 | 6.3 | 65 |
| Example 11 | 25 | Fe | 0.80 | 1.0 | 25 | FeNi | 0.5 | 32 | 6.3 | 65 |
| Example 12 | 40 | Fe | 0.78 | 1.3 | 25 | FeNi | 0.5 | 31 | 6.4 | 67 |
| Comparative example 1 | 5 | FeCo | 0.83 | 0.6 | 25 | FeSiCr | 0.5 | 42 | 5.3 | 51 |
| Comparative example 2 | 60 | FeCo | 0.72 | 1.5 | 25 | FeSiCr | 0.5 | 41 | 5.4 | 53 |
| Comparative example 3 | 5 | Fe | 0.82 | 0.5 | 25 | FeSiCr | 0.5 | 41 | 5.2 | 49 |
| Comparative example 4 | 60 | Fe | 0.73 | 1.5 | 25 | FeSiCr | 0.5 | 40 | 5.1 | 47 |
| Comparative example 5 | 40 | FeCo | 0.33 | 0.3 | 25 | FeSiCr | 0.5 | 50 | 4.8 | 40 |
| Comparative example 6 | 40 | FeCo | 0.45 | 0.3 | 25 | FeSiCr | 0.5 | 44 | 5.1 | 48 |
| Comparative example 7 | 40 | FeCo | 0.53 | 0.4 | 25 | FeSiCr | 0.5 | 40 | 5.4 | 54 |
| Example 13 | 40 | FeCo | 0.61 | 0.5 | 25 | FeSiCr | 0.5 | 35 | 5.7 | 61 |
| Example 14 | 40 | FeCo | 0.70 | 0.9 | 25 | FeSiCr | 0.5 | 31 | 5.9 | 64 |
| Comparative example 8 | 40 | SiO$_2$ Aerosil | 0.83 | 0.1 | 25 | FeSiCr | 0.5 | 42 | 5.0 | 45 |
| Example 15 | 40 | FeCo | 0.77 | 1.4 | 25 | FeSiCr | 0.2 | 33 | 5.8 | 62 |
| Example 16 | 40 | FeCo | 0.77 | 1.4 | 25 | FeSiCr | 0.7 | 28 | 6.0 | 65 |
| Example 17 | 40 | FeCo | 0.77 | 1.4 | 25 | FeSiCr | 1.0 | 28 | 5.9 | 64 |

In Examples 1 to 17, the mixed product of the magnetic particle for the magnetic core and the fluidizing particle had an excellent fluidity, and the core density of the magnetic core increased. As a result, the magnetic core having an excellent permeability was obtained.

In Comparative examples 1 and 3, the particle used instead of the fluidizing particle had a small particle size, and the mixed product of the particle and the magnetic particle for the magnetic core had a poor fluidity, thus the core density of the magnetic core decreased. As a result, the permeability of the magnetic core decreased.

In Comparative examples 2 and 4, the particle used instead of the fluidizing particle had a large particle size, and the mixed product of the particle and the magnetic particle for the magnetic core had a poor fluidity, further the core density of the magnetic core decreased. As a result, the permeability of the magnetic core decreased.

In Comparative examples 5 to 7, the particle used instead of the fluidizing particle had a small circularity, and the mixed product of the particle and the magnetic particle for the magnetic core had a poor fluidity, further the core density of the magnetic core decreased. As a result, the permeability of the magnetic core decreased.

In Comparative example 8, AEROSIL was used instead of the fluidizing particle. AEROSIL had a poor dispersibility. Hence, the mixed product of the magnetic particle for the magnetic core and AEROSIL had a poor fluidity, and the core density of the magnetic core decreased. As a result, the permeability of the magnetic core decreased.

The magnetic core with an excellent permeability was obtained in Examples 1 to 17 as discussed in above. The reason for this is thought as described in below.

Figure 2:
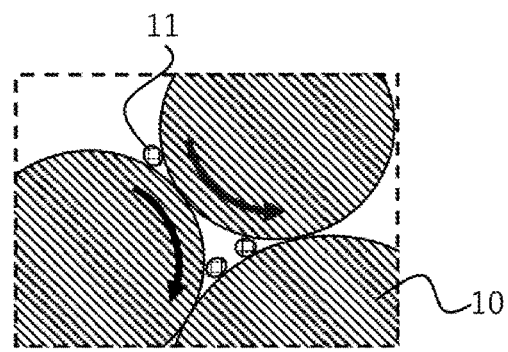
FIG. 2 is a schematic diagram of which an area surrounded by a broken line of FIG. 1 is enlarged.

As shown in FIG. 1 and FIG. 2, in Examples 1 to 17, the fluidizing particle 11 having a high circularity existed between the magnetic particles 10 for the magnetic core. Thus, as the arrow shown in FIG. 2 indicates, the magnetic particle 10 for the magnetic core easily rotated in a direction which enhanced the fluidity of the magnetic particle 10. As a result, the core density was improved, and the magnetic core with an excellent permeability was able to obtain.

Figure 3:
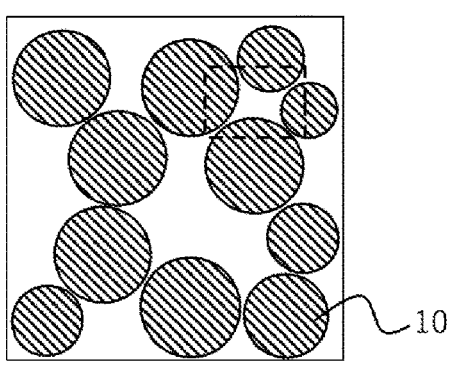
FIG. 3 is a schematic diagram showing when a particle having a low circularity (Comparative examples 5 to 7) is used.
Figure 4:
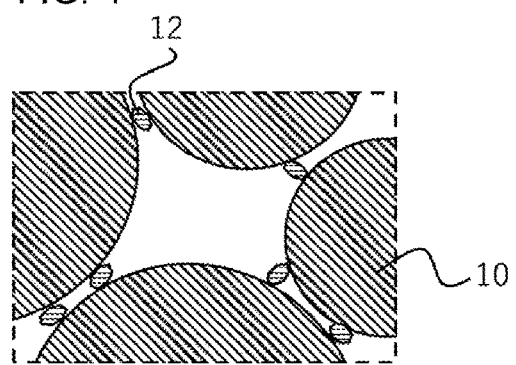
FIG. 4 is a schematic diagram of which an area surrounded by a broken line of FIG. 3 is enlarged.

On the other hand, as shown in FIG. 3 and FIG. 4, in Comparative examples 5 to 7, a particle 12 having a low circularity existed between the magnetic particles 10 for the magnetic core. Hence, the rotation of the magnetic particle 10 for the magnetic core was interfered. As a result, the fluidity of the magnetic particle 10 for the magnetic core was compromised, and the core density deceased. Thus, it is thought that the permeability of the magnetic core decreased.

Figure 5:
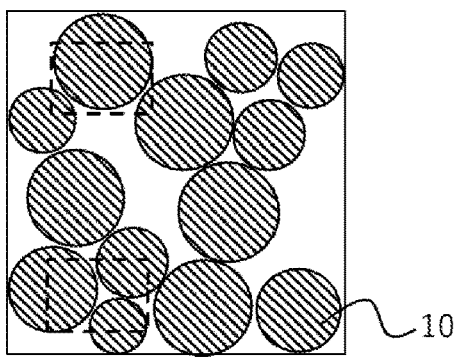
FIG. 5 is a schematic diagram showing when AEROSIL is used (Comparative example 8).
Figure 6:
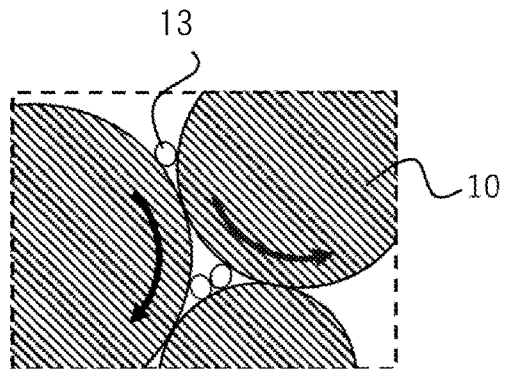
FIG. 6 is a schematic diagram of which an area surrounded by a broken line of FIG. 5 is enlarged.
Figure 7:
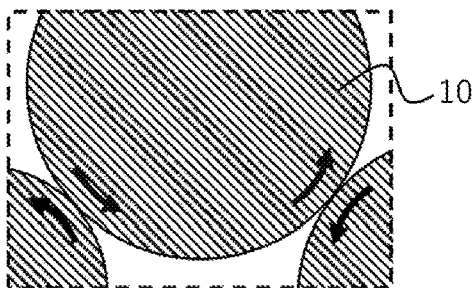
FIG. 7 is a schematic diagram of which an area surrounded by a broken line of FIG. 5 is enlarged.

As shown in FIG. 5 and FIG. 6, in Comparative example 8, at the position where AEROSIL 13 existed between the magnetic particles 10 for the magnetic core, the magnetic particle 10 tended to easily rotate in a direction which enhanced the fluidity as the arrow in FIG. 6 indicates. However, AEROSIL had a poor dispersibility. Thus, at the position where AEROSIL 13 did not exist, the rotation of the magnetic particle 10 for the magnetic core was interfered as shown in FIG. 7, and the fluidity decreased. As a result, the fluidity of the magnetic particle 10 for the magnetic core as a whole deteriorated, the core density deceased, and it is thought that the permeability of the magnetic core decreased.

NUMERICAL REFERENCES

10 . . . Magnetic particle for magnetic core
11 . . . Fluidizing particle
12 . . . Particle having low circularity
13 . . . AEROSIL

What is claimed is:

1. A fluidizing particle comprising
a particle body having a magnetic property and a coating layer including a silicon compound covering the particle body, wherein
a particle size of the fluidizing particle is 10 to 40 nm, and
a circularity of the fluidizing particle is 0.55 or more.

2. The fluidizing particle according to claim 1, wherein the particle body includes at least one selected from the group consisting of Fe, Co, and Ni.

3. The fluidizing particle according to claim 1, wherein a bulk density is 0.6 to 1.4 g/cm$^3$.

4. A magnetic core including the fluidizing particle according to claim 1 and a magnetic particle, wherein a particle size of the magnetic particle is larger than a particle size of the fluidizing particle.

5. The fluidizing particle according to claim 1, wherein the circularity of the fluidizing particle is 0.60 or more.

6. The fluidizing particle according to claim 1, wherein the circularity of the fluidizing particle is 0.69 or more.

7. The fluidizing particle according to claim 1, wherein the coating layer has a thickness of 1 to 4 nm.

8. The fluidizing particle according to claim 1, wherein the particle size of the fluidizing particle is 15 to 40 nm.

9. The fluidizing particle according to claim 1, wherein the bulk density is 0.6 to 1.3.

10. The fluidizing particle according to claim 1, wherein the bulk density is 0.7 to 1.3.

11. The fluidizing particle according to claim 1, wherein the silicon compound is $SiO_2$.

12. The magnetic core according to claim 4, wherein the magnetic particle has a particle size of 3 to 50 μm.

13. The magnetic core according to claim 4, wherein the magnetic particle has a particle size of 5 to 30 μm.

14. The magnetic core according to claim 4, wherein the magnetic particle has an insulation coating.

15. The magnetic core according to claim 14, wherein the insulation coating is made of $SiO_2$.

16. The magnetic core according to claim 4, wherein an amount of the fluidizing particle is 0.2 to 1.0 wt % with respect to 100 wt % of the magnetic particle.

17. The magnetic core according to claim 4, which includes a resin binder in an amount of 2 wt % to 10 wt % with respect to 100 wt % of the magnetic core.

* * * * *